(12) United States Patent
Kedzierski

(10) Patent No.: US 12,531,495 B2
(45) Date of Patent: Jan. 20, 2026

(54) MULTILAYERED MICROHYDRAULIC ACTUATORS

(71) Applicant: Massachusetts Institute of Technology, Cambridge, MA (US)

(72) Inventor: Jakub T. Kedzierski, Nashua, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 242 days.

(21) Appl. No.: 18/451,358

(22) Filed: Aug. 17, 2023

(65) Prior Publication Data
US 2023/0396188 A1     Dec. 7, 2023

Related U.S. Application Data

(63) Continuation of application No. 17/647,107, filed on Jan. 5, 2022, now Pat. No. 11,777,422.

(60) Provisional application No. 63/134,284, filed on Jan. 6, 2021.

(51) Int. Cl.
    *H02N 1/00*            (2006.01)

(52) U.S. Cl.
    CPC .............. *H02N 1/004* (2013.01); *H02N 1/00* (2013.01)

(58) Field of Classification Search
    CPC ................................. H02N 1/004; H02N 1/00
    See application file for complete search history.

(56) References Cited

U.S. PATENT DOCUMENTS

| | | | |
|---|---|---|---|
| 7,091,658 B2 | 8/2006 | Ito et al. | |
| 7,733,549 B2 | 6/2010 | Sugahara | |
| 8,349,150 B2 | 1/2013 | Sugahara | |
| 9,806,639 B2 | 10/2017 | Chen et al. | |
| 9,815,061 B2 | 11/2017 | Delattre et al. | |
| 11,060,511 B1 | 7/2021 | Kartalov et al. | |
| 2019/0020287 A1 | 1/2019 | Suzuki et al. | |
| 2022/0216808 A1 | 7/2022 | Kedzierski | |

OTHER PUBLICATIONS

Ashurst, W. Robert et al. "Vapor Phase Anti-Stiction Coatings for MEMS" IEEE Transactions on Device and Materials Reliability, vol. 3, No. 4; Dec. 2003; 6 Pages.

Duduta, Mihai et al. "Multilayer Dielectric Elastomers for Fast, Programmable Actuation Without Prestretch" Advanced Materials; Jul. 4, 2016; 23 Pages.

Basha, Mohamed A. et al. "Design and Fabrication of an Electrostatic Micromotor with a Low Operating Voltage" In Transducers 2007—2007 International Solid-State Sensors, Actuators and Microsystems Conference, Jun. 2007; 4 Pages.

Berry, Shaun et al. "Low Voltage Electrowetting Using Thin Fluoroploymer Films" Science, vol. 303, Issue 2; Nov. 2006; 8 Pages.

(Continued)

*Primary Examiner* — Burton S Mullins
(74) *Attorney, Agent, or Firm* — Daly, Crowley, Mofford & Durkee, LLP

(57) ABSTRACT

An actuator with a stack of thin layers operates by electrowetting droplets between the layers. The actuator includes a first layer structure and a second layer structure positioned adjacent to the first layer structure. One or more liquid droplets are pinned to one of the layers and are positioned between the layers. The other layer includes electrodes. When the electrodes are energized, they electrostatically attract the liquid droplets to create relative motion between the two layers.

27 Claims, 15 Drawing Sheets

(56) References Cited

OTHER PUBLICATIONS

Fan, Long-Sheng, et al. "IC-Processed Electrostatic Micro-Motors. Technical Digest" International Electron Devices Meeting, 1988; 4 Pages.
Hirata, H. et al. "Design of a Traveling Wave Type Ultrasonic Motor" IEEE Transactions on Ultrasonics, Ferroelectrics, and Frequency Control, vol. 42, Issue 2, Mar. 1995; 7 Pages.
Kedzierski, Jakub et al. "Linear and Rotational Microhydraulic Actuators Driven by Electrowetting" Science Robotics 3, Sep. 19, 2018; 10 Pages.
Kedzierski, Jakub et al. "Microhydraulic electrowetting actuators" Journal of Microelectromechical Systems, vol. 25, No. 2; Apr. 2016; 7 Pages.
Kedzierski, Jakub et al. "Re-Engineering Artificial Muscle with Microhydraulics" Microsystems and Nanoengineering 3; Jun. 5, 2017; 8 Pages.
Kellaris, Nicholas et al. "Peano-HASEL Actuators: Muscle-Mimetic, Electrohydraulic Transducers That Linearly Contract on Activation" Science Robotics, vol. 3, Issue 14; Jan. 31, 2018; 11 Pages.
Kumada, Akio, "A Piezoelectric Ultrasonic Motor" Japanese Journal of Applied Physics, vol. 24; 1985; 4 Pages.
Le, Huu Minh et al. "A survey on actuators-driven surgical robots" Sensors and Actuators A: Physical; vol. 247, Aug. 15, 2016; 32 Pages.
Livermore, Carol et al. "A High-Power MEMS Electric Induction Motor" Journal of Microelectromechanical Systems, vol. 13, Issue 3, Jun. 2004; 4 Pages.
Morita, Takeshi, "Miniature Piezoelectric Motors" Sensors and Actuators A: Physical, vol. 103, Issue 3, Feb. 15, 2003; 10 Pages.
Park, Chan Woo et al. "Photolithography-Based Patterning of Liquid Metal Interconnects for Monolithically Integrated Stretchable Circuits" ACS Appl. Mater. Interfaces, Jun. 2, 2016; 7 pages.
Penskiy, I. et al. "Optimized Electrostatic Inchworm Motors Using a Flexible Driving Arm" Journal of Micromechanics and Microengineering, vol. 23, No. 1; Dec. 13, 2012; 12 Pages.
Srinivasan, Uthara et al. "Microstructure to Substrate Self-Assembly Using Capillary Forces" Journal of Microelectromechanical Systems, vol. 10, No. 1; Mar. 2001; 8 Pages.
Suarez, Francisco et al. "Flexible Thermoelectric Generator Using Bulk Legs and Liquid Metal Interconnects for Wearable Electronics" Applied Energy, vol. 202; Sep. 2017; 15 Pages.
Takahashi, Sadayuki "Multilayer Piezoelectric Ceramic Actuators and Their Applications" Japanese Journal of Applied Physics, vol. 24, No. S2; 1985; 5 Pages.
Takei, Atsushi et al. "Liquid motor driven by electrowetting" 2008 IEEE 21$^{st}$ International Conference on Micro Electro Mechanical Systems, Jan. 2008; 4 Pages.
Toffoli, Tommaso et al. "Programmable Matter: Concepts and Realization" Physica D 47; 1991; 10 Pages.
Yeh, Richard et al. "Single Mask, Large Force and Large Displacement Electrostatic Linear Inchworm Motors" Journal of Microelectromechanical Systems, vol. 11, No. 4, Aug. 2002; 7 Pages.
Zhang, Wen-Ming et al. "Electrostatic Pull-In Instability in MEMS/NEMS: A Review" Sensors and Actuators A: Physical, vol. 214; Aug. 1, 2014; 32 Pages.
Zhao, Ya-Pu et al. "Fundamentals and Applications of Electrowetting: A Critical Review" Rev. Adhesion Adhesives, vol. 1, No. 1; Feb. 2013; 61 Pages.
U.S. Non-Final Office Action dated Jan. 18, 2023 for U.S. Appl. No. 17/647,107; 18 Pages.
Response to Non-Final Office Action dated Jan. 18, 2023 for U.S. Appl. No. 17/647,107, filed Mar. 20, 2023; 17 Pages.
U.S. Final Office Action dated Mar. 28, 2023 for U.S. Appl. No. 17/647,107; 12 Pages.
Response to U.S. Final Office Action dated Mar. 28, 2023 for U.S. Appl. No. 17/647,107, filed Apr. 21, 2023; 12 Pages.
U.S. Notice of Allowance dated May 26, 2023 for U.S. Appl. No. 17/647,107; 6 Pages.
U.S. Supplemental Notice of Allowability dated Jun. 5, 2023 for U.S. Appl. No. 17/647,107; 2 Pages.
Rule 3.12 Amendment dated Aug. 17, 2023 for U.S. Appl. No. 17/647,107; 11 Pages.

MULTILAYERED MICROHYDRAULIC ACTUATORS

CROSS REFERENCE SECTION

This application is a continuation of U.S. utility application Ser. No. 17/647,107 filed on Jan. 5, 2022 which claims priority to and benefit of U.S. provisional Application No. 63/134,284 filed on Jan. 6, 2021, which are incorporated herein by reference in its entirety.

STATEMENT REGARDING FEDERALLY SPONSORED RESEARCH

This invention was made with government support under FA8702-15-D-0001 awarded by the U.S. Air Force. The government has certain rights in the invention.

FIELD

This application relates to actuators and, more specifically, to multi-layered microhydraulic actuators.

BACKGROUND

Electrostatic motors have traditionally suffered from high voltage and low torque. The lack of a robust electrostatic motor technology is of particular concern in microsystems, because inductive motors do not scale well to small dimensions. Often microsystem designers must choose from a host of imperfect actuation solutions, leading to high voltage requirements or low efficiency and thus straining the power budget of a system.

Microelectromechanical (MEMS) motors can provide rotational actuation. At a micro-scale, higher driving frequency can increase power density, and smaller electrode gaps can reduce driving voltage. However, MEMS motors have relatively low torque and the inability to scale in three dimensions due to their inherently thin nature To address these challenges a desirable electrostatic motor technology should offer relatively low-voltage, relatively high-torque, relatively high-efficiency, and the ability to scale.

SUMMARY

Microhydraulic actuators provide benefits such as relatively low-voltage, relatively high-torque, relatively high efficiency, and the ability to scale in thickness and in three dimensions. Microhydraulic technology operates by electrically distorting equilibrium surface tension state of attached liquid droplets with electrowetting. These droplets can be chemically pinned to a structure. Then, electrostatic forces can be used to attract the droplets and move the structure to create actuation.

Using this concept, a microhydraulic motor can include multiple microhydraulic layers arranged in a stack with electrical connections between the multiple microhydraulic layers.

A multilayer microhydraulic motor provided in accordance with the concepts as described herein may be capable of integrating forces from the multiple microhydraulic layers (e.g. two or more microhydraulic layers). By utilizing multiple microhydraulic layers, actuators have a depth and a significant volume to generate force and mechanical power. This results in a microhydraulic motor capable of generating forces larger than single layer microhydraulic motors. In embodiments, the achievable forces may be increased by up to three orders of magnitude or more compared with prior art, single layer, microhydraulic motors. Consequently, the multilayer microhydraulic motors described herein may be suitable for use in a wide variety of practical, real-world applications including, but are not limited to: robotic joints, optomechanical gimbals, unmanned arial vehicles (UAVs), medical devices, consumer electronics for foldable displays or haptic feedback, micro-assembly devices, and reconfigurable materials.

In an embodiment, an actuator that may provide some or all the benefits and features described in this disclosure comprises: a first layer structure; a second layer structure positioned adjacent to the first layer structure; and one or more liquid droplets positioned between the first layer structure and the second layer structure. The one or more liquid droplets are pinned to the first layer. The actuator also includes one or more electrodes positioned on the second layer and configured to move the first layer structure relative to the second layer structure by electrostatically attracting the one or more liquid droplets pinned to the first layer structure.

One or more of the following features may be includes.

The liquid droplets may be conductive.

The liquid droplets may comprise water.

The liquid droplets may be surrounded by a layer of oil.

The layer structures may be disc-shaped and the actuator may be a rotational motor.

The layer structures may comprise tracks and the actuator may be a linear motor.

The actuator may include a base layer structure configured to immobilize either the first layer structure or the second layer structure.

At least one of the liquid droplets may form electrical connections between the first layer structure and the second layer structure.

A control circuit may be coupled to the one or more electrodes and configured to selectively energize the one or more electrodes on one layer to electrostatically attract the liquid droplets on an adjacent layer.

The actuator may be a stepper motor and the control circuit may be configured to energize the one or more electrodes to step the first layer structure and the second layer structure relative to each other.

The control circuit may be electrically coupled to the electrodes through one or more of: the liquid droplets, a foldable flexible interconnect between the first layer structure and the second layer structure, a via through the first layer and/or the second layer, and a conductive pin coupled to the first layer and/or the second layer.

In another embodiment, an actuator comprises a plurality of stacked layer structures including: one or more first layer structures having liquid droplets pinned to at least one side of the one or more first layer structures; and one or more second layer structures having electrodes pinned to at least one side of the one or more second layer structures. The plurality of layer structures is stacked so that the sides of the layer structures having liquid droplets are facing the sides of the layer structures having electrodes. The actuator includes a control circuit electrically coupled to selectively energize at least one electrode of the one or more second layer structures, to cause the at least one electrode to electrostatically attract at least one liquid droplets of one or more first layer structures, to create relative motion between the first layer structures and the second layer structures.

One or more of the following features may be included.

The liquid droplets may comprise water.

The liquid droplets may be surrounded by a layer of oil.

The layer structures may be disc-shaped and the actuator may be a rotational motor.

The layer structures may comprise tracks and the actuator may be a linear motor.

The actuator may include a base layer structure configured to immobilize at least one layer structure of the plurality of layer structures.

The liquid droplets may form electrical connections between at least two-layer structures of the plurality of layer structures.

The actuator may be a stepper motor and the control circuit may be configured to energize the one or more electrodes to step the layer structures.

The control circuit may be electrically coupled to the electrodes through one or more of: the liquid droplets, a foldable flexible interconnect, a via through at least one of the layers of the plurality of layers, and a conductive pin coupled to at least two layers of the plurality of layers.

The control circuit may be configured to cause at least some of the layers to move in a same direction to increase a speed output of the actuator.

The control circuit may be configured to cause at least some of the layers to move in opposite directions relative to each other to increase a torque output of the actuator.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

Figure 1:
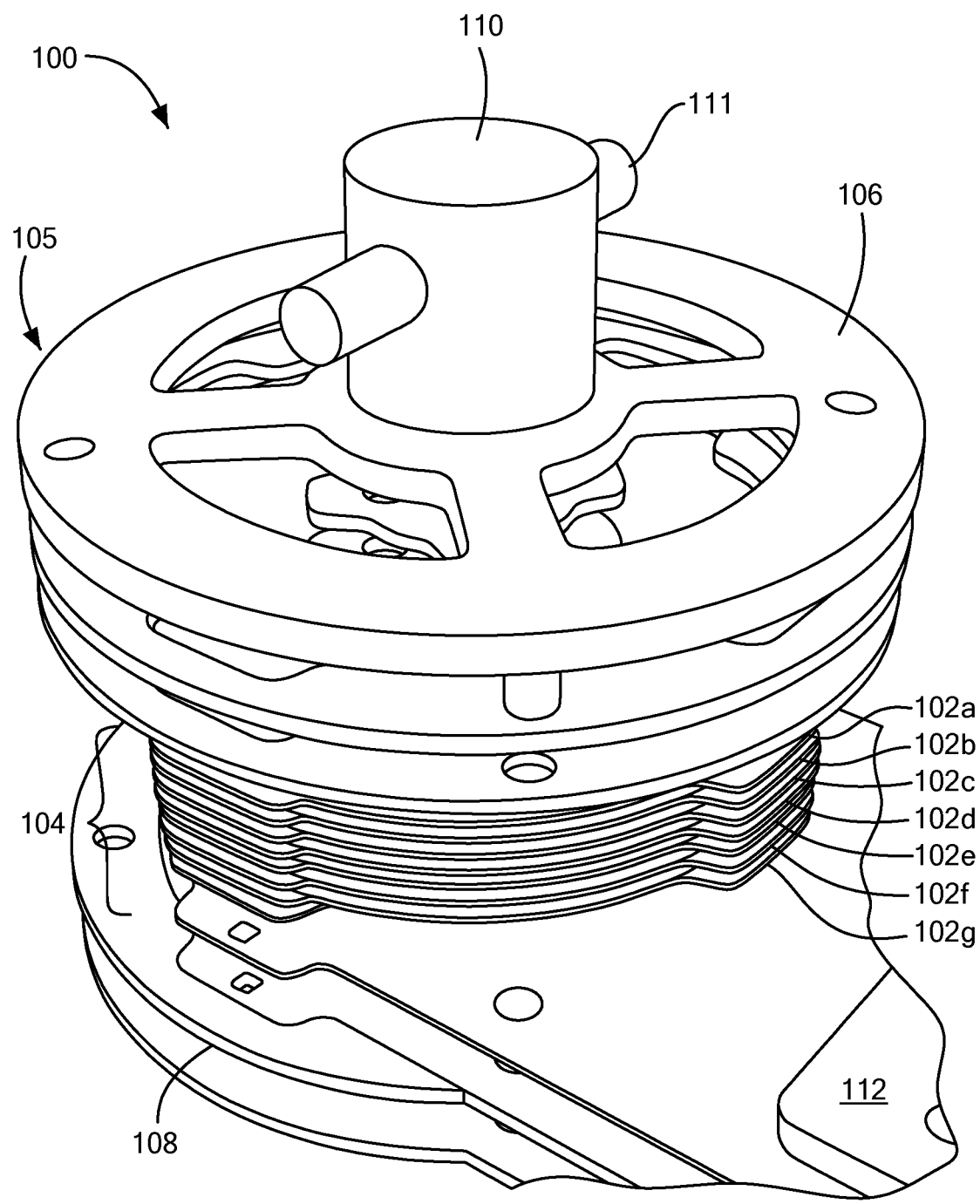
FIG. 1 is a transparent isometric view of a rotational actuator.

FIG. 1 is an isometric diagram of a rotational actuator 100 comprising one or more disc-shaped layer structures 102a-102g. In the example of embodiment of FIG. 1 a plurality of layers structures 102a-102g are disposed in a stack 104. The actuator 100 further includes a housing 105 having a top portion (or cap) 106 and a bottom portion (or base) 108 to hold the stack of layer structures (or "layers") 104 in place. The actuator 100 also includes an axle 110 (or motor shaft) which the actuator can rotate or otherwise move. The axle may optionally include attachment structures (e.g. post 111) that can provide methods of attaching the actuator to other mechanical elements. Control circuit 112 is electrically coupled to one or more of the layers 102a-102g to provide power and/or control the actuator's motion. For example, actuator 100 may be a motor such as a stepper motor and the control circuit 112 can control the rotation, direction of rotation, angular position (e.g. a rotational angle at which the axle 110 is stopped), and rotational speed of the axle 110.

The control circuit 112 may be a single circuit or may comprise multiple circuits to control the actuator 100. For example, the control circuit 112 may include analog and digital circuits such as logic circuits that control the signals provided to electrodes of the actuator, power circuits that provide power to the actuator, safety circuits, filters, and signal shaping circuits, etc. In some embodiments, the control circuit 112 may be (or may include) a programmable circuit such as a processor that can execute software instructions stored in a memory, or programmable hardware such as a field-programmable gate array circuit.

Figure 2:
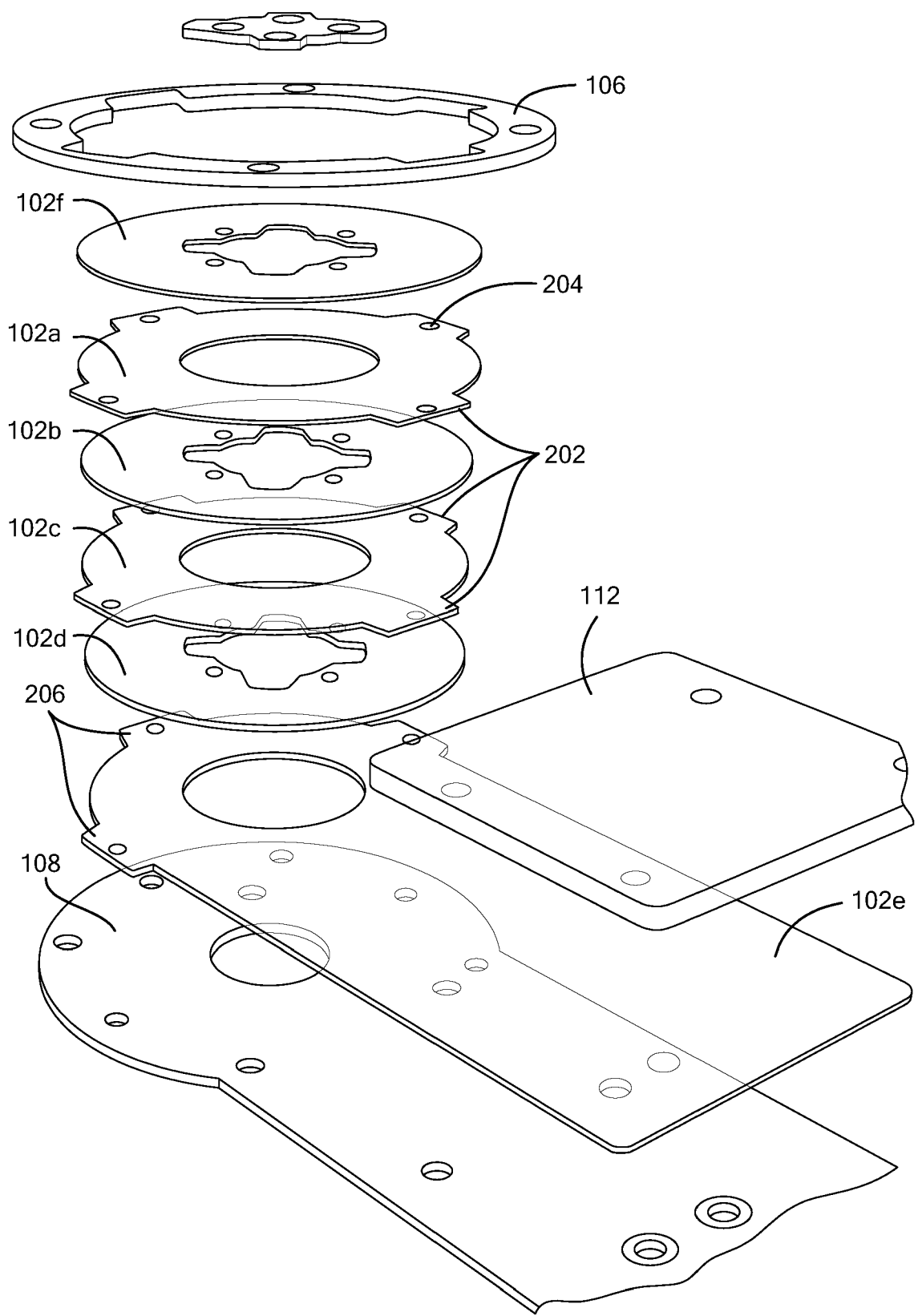
FIG. 2 is an exploded view of the rotational actuator of FIG. 1.

FIG. 2 is an exploded view of the rotational actuator 100 of FIG. 1. In this example, the layers 102a and 102c include holes 204 in the mounting structures, which allow the layers 102a and 102c to be coupled. For example, mounting structures 202 on their outer edge fastened or otherwise coupled to a base layer 102e and/or bottom portion 108. In this configuration, layers 102a and 102c may be held stationary relative to the bottom portion (or "base") 108 while layers 102f, 102b, and 102d rotate. In other configurations, all the layers 102a-102g may rotate relative to the bottom portion 108. In general, depending on the gearing desired in the actuator 100, any number of the layers 102a-102g may be configured to rotate or remain stationary relative to the base portion 108. These gearing configurations will be discussed in greater detail below. In general, including a greater number of layers may provide more flexible options for gearing to adjust speed and torque output of the actuator.

The layers 102a-102g may be formed from a rigid or semi-rigid material, such as a thin plastic, a ceramic, a glass, a metal, a semiconductor, etc. For example, the layers 102a-102g may be provided from polyimide having a thickness less than about 1 mm, or less than about 0.01 mm thick. This may result in an actuator having a total thickness T that is 1 cm or smaller, or 1 mm or smaller, or 0.5 mm or smaller. The layers have a thickness of 25 µm or less, 10 µm or less, 8 µm or less, or 6 µm.

In embodiments, the layers will include grooves (see FIG. 3) into which are disposed liquid droplets and/or electrical traces that form electrodes. Droplets of liquid on one or both surfaces of the layers separate the layers and allow them to rotate with relatively low friction.

Figure 3:
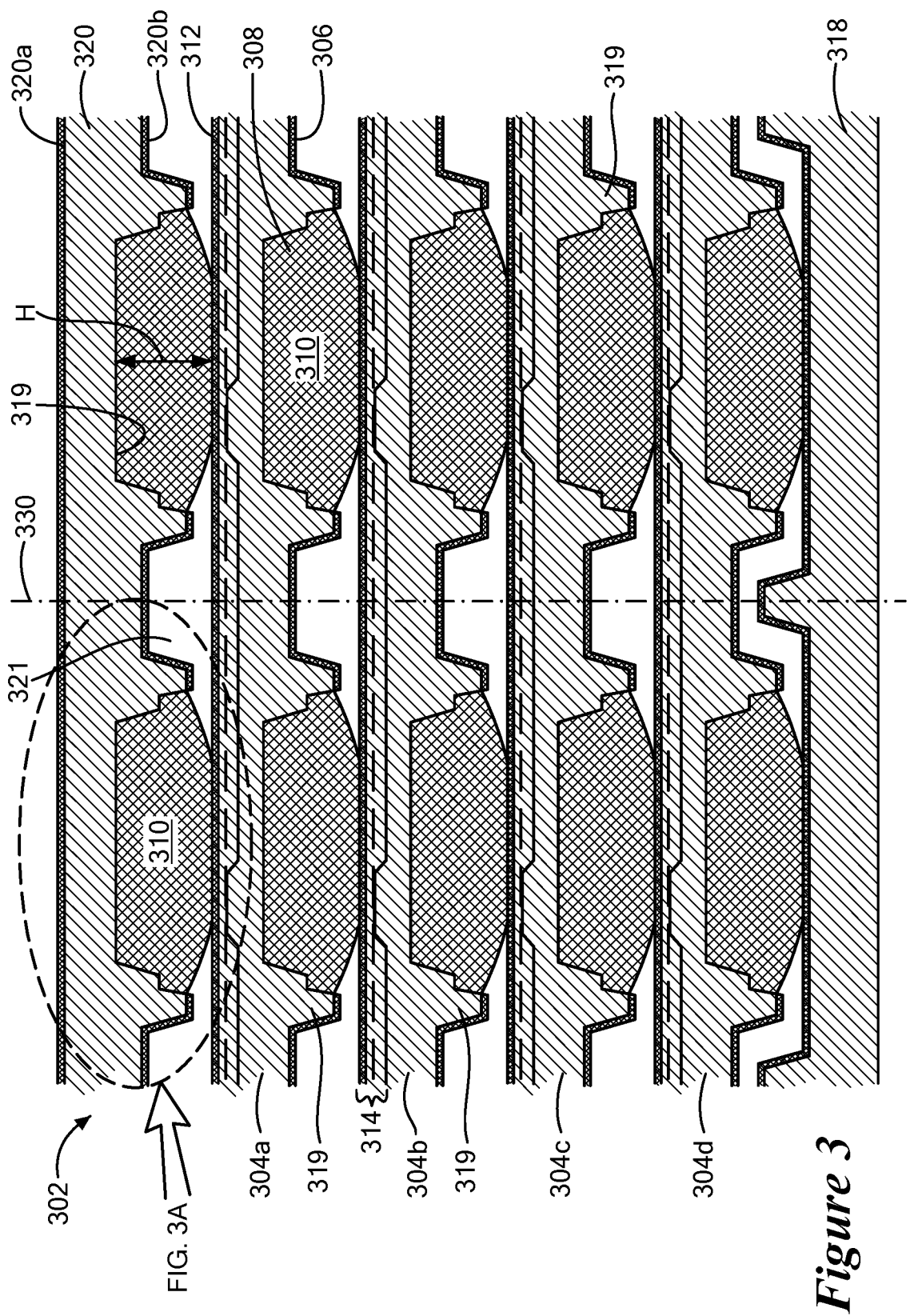
FIG. 3 is a cross-sectional view of stacked layers of an actuator.
Figure 3A:
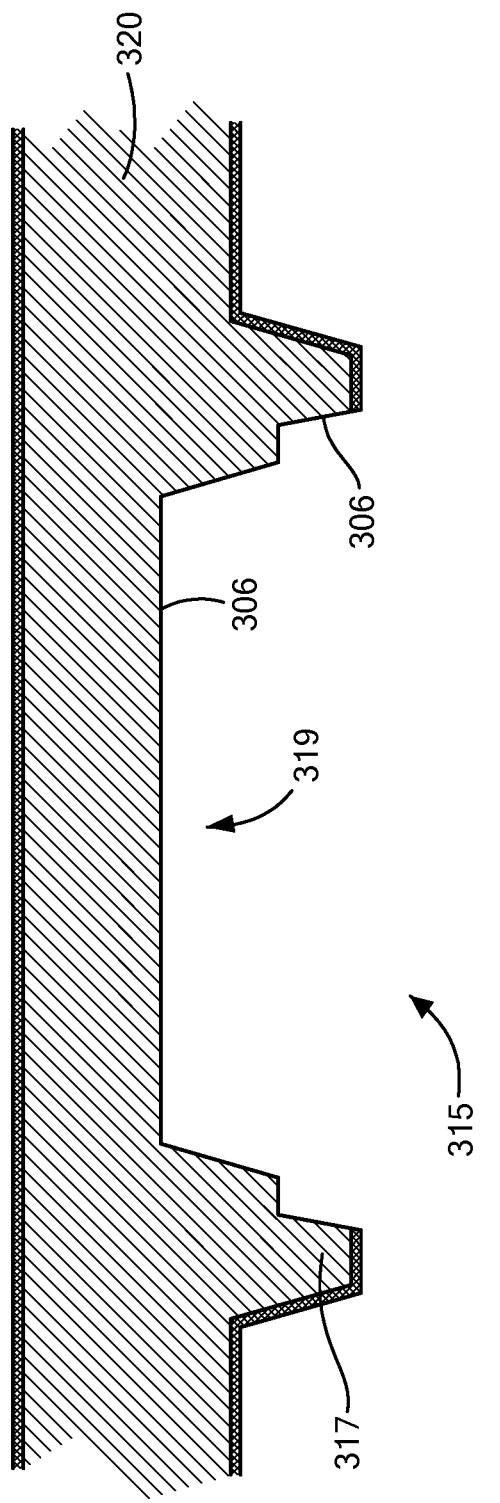
FIG. 3A is a magnified view of a portion of the actuator of FIG. 3.

FIG. 3 is a cross-sectional view of a stack 302 of layers 304a-304d, 320. FIG. 3A is a magnified view of a portion of the actuator in FIG. 3. Like numbers in FIGS. 3 and 3A denote like elements. The stack 302 and layers 304a-304d, 320 may be the same as or similar to the stack 104 of layers 102a-102g shown in FIGS. 1 and 2. The stack 302 may include a base layer 318 that may remain stationary with respect to the other layers 304a-304d, and which defines one end of the stack. In embodiments, the base layer is mechanically secured to a housing or other structure so that it remains stationary. The stack 302 may also include a top (or cap) layer 320 that defines the opposite end of the stack.

In this example, the stack 302 includes five rotational layers (i.e. layers which may rotate or move around a central longitudinal axis 330): layers 304a-304d and top layer 320. In other embodiments, the stack 302 may include less than five or more than five rotational layers. In embodiments, the stack may comprise one or more rotational layers.

Each layer has first and second opposing surfaces. One or more of the layers 304a-304d, 320 may have a first surfaces (e.g. surface 306) having liquid droplets (e.g. droplet 310) disposed or otherwise positioned thereon (and thus is sometimes referred to as a droplet surface). In embodiments, the liquid droplets may be semi-spherical or semi-cylindrical. In the example embodiment of FIG. 3, surface 306 is provided having one or more wells 315 (see FIG. 3A) in which droplets 310 are disposed. In this example embodiment, wells 315 are formed via a combination of wall structures 317 and recesses or indentations 319 (FIG. 3A). In embodiments, wells 315 may be provided from wall structures alone or recesses alone (i.e. it is not necessary to use a combination of recesses and wall structures). The liquid droplets may be disposed or positioned between layers and may be physically and/or chemically pinned to one of the layers. For example, liquid droplet 310 is positioned between layer 304a and layer 304b. It is physically and/or chemically pinned within indentation 308 and wall structure 319 of layer 304a. The combination of indentation and wall structure may provide the liquid droplet with a height H of droplet which is greater that a height which may be achieved using either the indentation or wall structure alone and may provide stability so that the liquid droplet 310 does not move relative to layer 304a. However, the liquid droplet 310 is not physically or chemically pinned to layer 304b to allow layer 304b to move (e.g. rotate) relative to droplet 310 and layer 304a. In general, the layers are formed from solid material, which may be flexible or rigid. The solid materials provide structure and are subject to internal forces of the actuator. The liquid droplets provide lubrication and motion, and act to provide electrostatic forces, as described herein.

In embodiments, the droplet side 306 of the layer 304a may comprise hydrophilic and hydrophobic solid surfaces, the hydrophilic areas wetted by the liquid droplets. The liquid droplets may comprise water containing 8 M LiCl, forming semi-cylindrical structured droplets. Uniform Laplace pressure may provide the shapes of the droplets.

In an embodiment, the rotational actuator may include two types of droplets: radial and circumferential, which may serve different functions. As will be described below in conjunction with FIGS. 5A-5C, the radial (or "drive") droplets (e.g. droplet 310) may be semi-cylindrical elongate droplets extending in a radial direction along the layers 304a-304d, 320. The circumferential "rail" droplets may extend circumferentially around areas of the layers 304a-304d, 320 to form inner and outer rails, which may be used as conductors to carry electrical signals to and from the electrodes. At the edges of all droplets there may be a structure (e.g. a wall of polyimide) to increase droplet height and reduce viscous effects during actuation One or more layers of oil 321 may be positioned around the liquid droplets to retain the liquid droplets in place and/or to prevent the liquid droplets from evaporating.

The oil and the liquid droplets may also act as very low friction lubricant and/or bearings between the layers. As a result, friction between moving layers 304a-304d, 320 in the stack 302 may be very low compared to friction between moving parts in traditional actuators.

One or more of the layers 304a-304d, 320 may also include a second surface (e.g. surface 312) having electrodes 314. The electrodes 314 may be formed in or on layer 304a by printing, etching, or any other additive or subtractive technique suitable for providing traces in or on a substrate. The electrodes may be electrically coupled to and controlled by the control circuit 112 shown in FIGS. 1 and 2. In general, the electrodes of one layer (e.g. electrodes 314 of layer 304a) may be disposed or otherwise positioned so they are disposed over the liquid droplets of an adjacent layer. In the example embodiment of FIG. 3, electrodes 314 are adjacent (or "facing") droplets 316 disposed on layer 320.

In embodiments, the layers 304a-304d, 320 can self-align. After self-alignment the translational misalignment may be less than 1 μm, and rotational misalignment less than 0.03°. Self-alignment can be obtained through patterned hydrophilic structures on opposite layers that mate, or in another technique through alignment pins.

Figure 4:
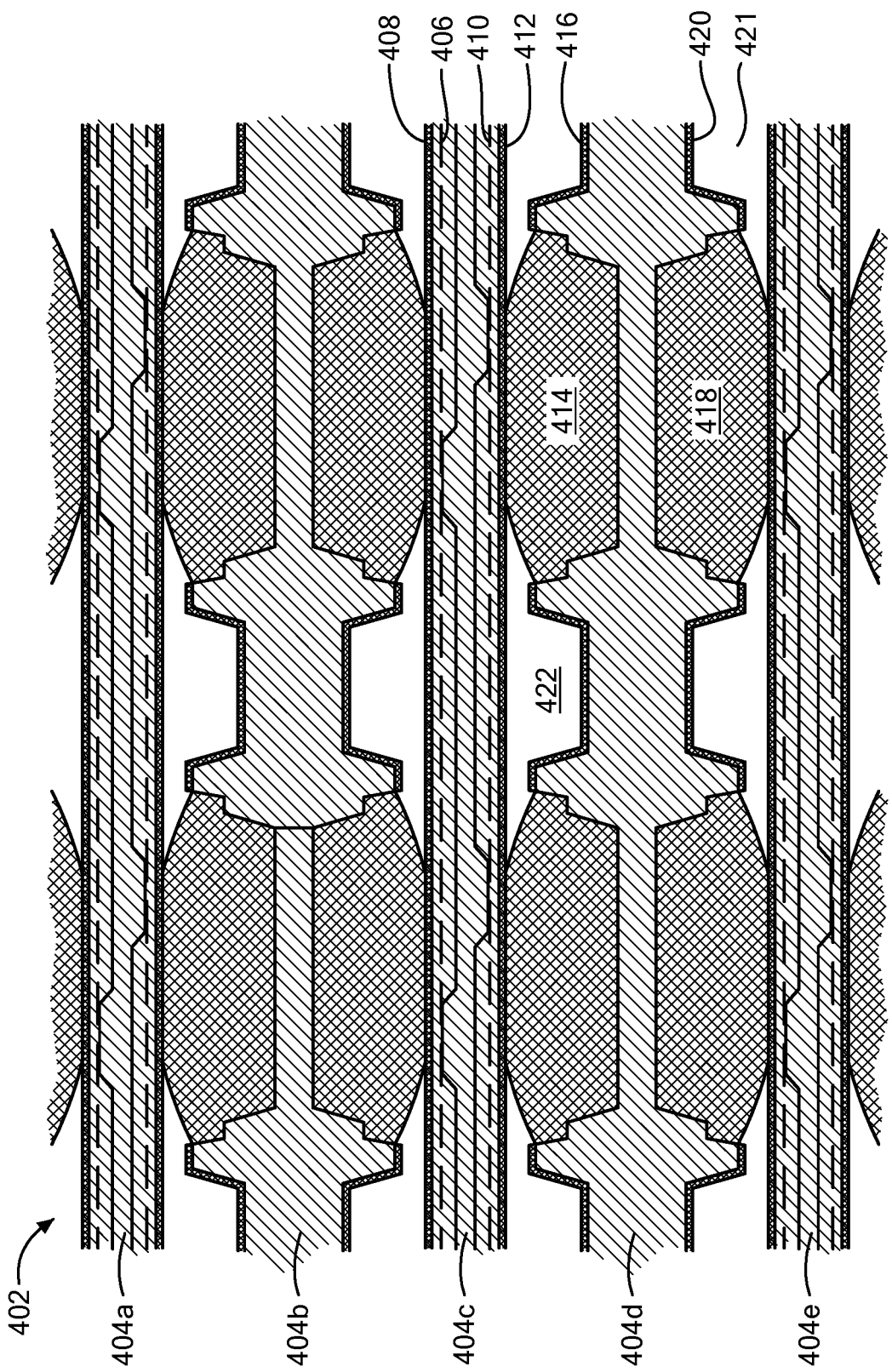
FIG. 4 is a cross-sectional view of stacked layers of an actuator.

FIG. 4 is a cross-sectional view of a stack 402 of layers 404. The stack 402 and layers 404 may be the same as or similar to the stack 104 of layers 102a-102g shown in FIGS. 1 and 2. The stack 402 may include base layers and top layers, as described in conjunction with FIGS. 1-3, but which are not shown in FIG. 4. In this example, the stack 402 includes five layers 404a-e. However, in other embodiments, the stack may include fewer or more than five layers.

Stack 402 may include a first type of layer having electrodes on both surfaces thereof. For example, layer 404c has one or more electrodes 406 on a first (or top) surface 408, and also one or more has electrodes 410 on a second, opposite (or bottom) surface 412. Stack 402 may also include a second type of layer that has liquid droplets on both surfaces thereof. For example, layer 404d has liquid droplets 414 on a first (or top) surface 416 and liquid droplets 418 on a second, opposite (or bottom) surface 420. Regions (or spaces) 421 between the liquid droplets and the layers may be filled with oil 422 that surrounds the liquid droplets and, in conjunction with the liquid droplets, creates a low-friction interface between adjacent layers.

In this arrangement, the first type of layer with electrodes on both sides (e.g. layers 404a, 404c, and 404e) and the second type of layers with liquid droplets on both sides (e.g. layers 404b and 404d) are stacked in an alternating fashion so that the liquid droplets are positioned or otherwise disposed between each pair of adjacent layers.

Figure 5A:
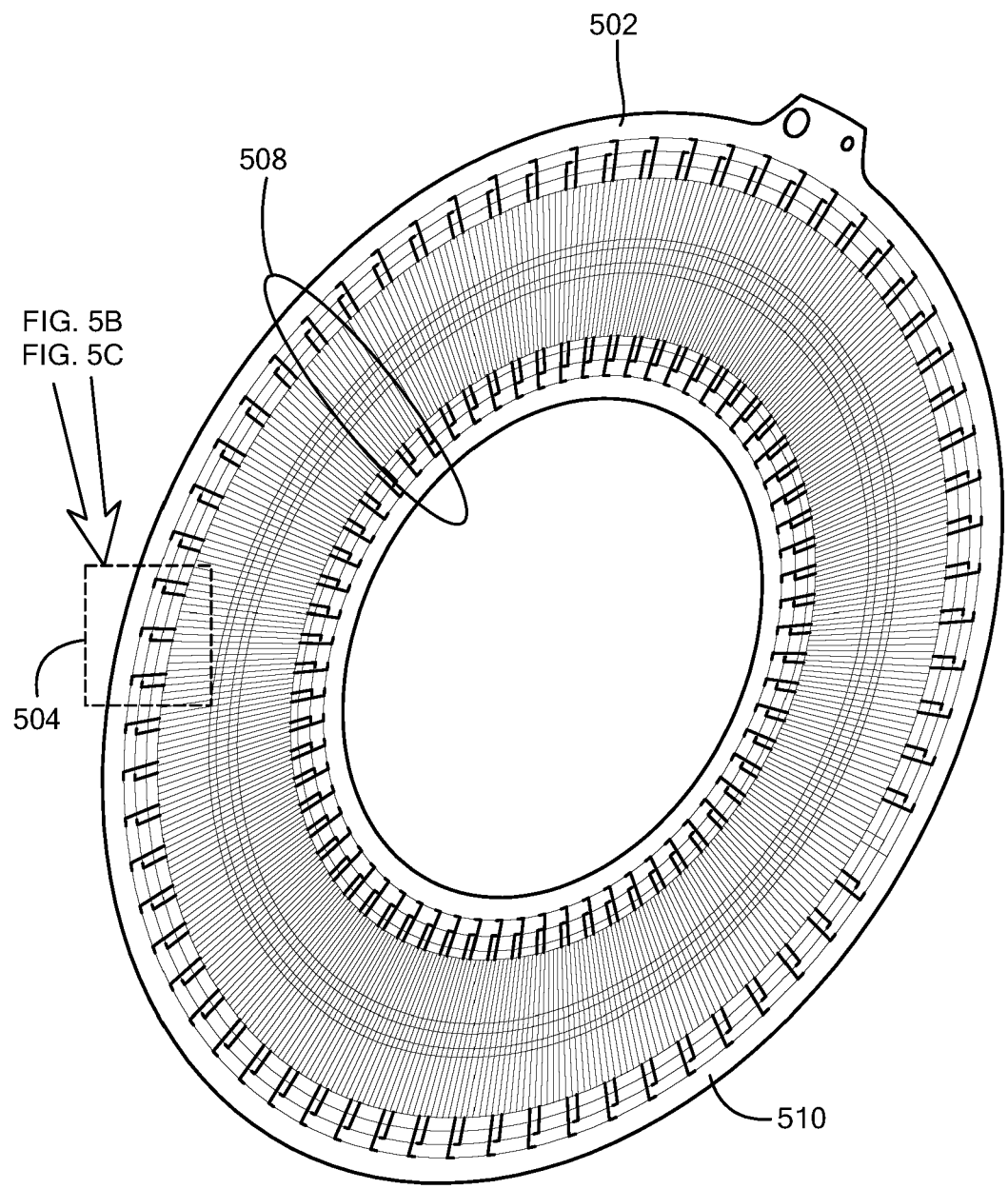
FIGS. 5A, 5B, and 5C are diagrams of a layer showing a droplet side and an electrode side.
Figure 5B:
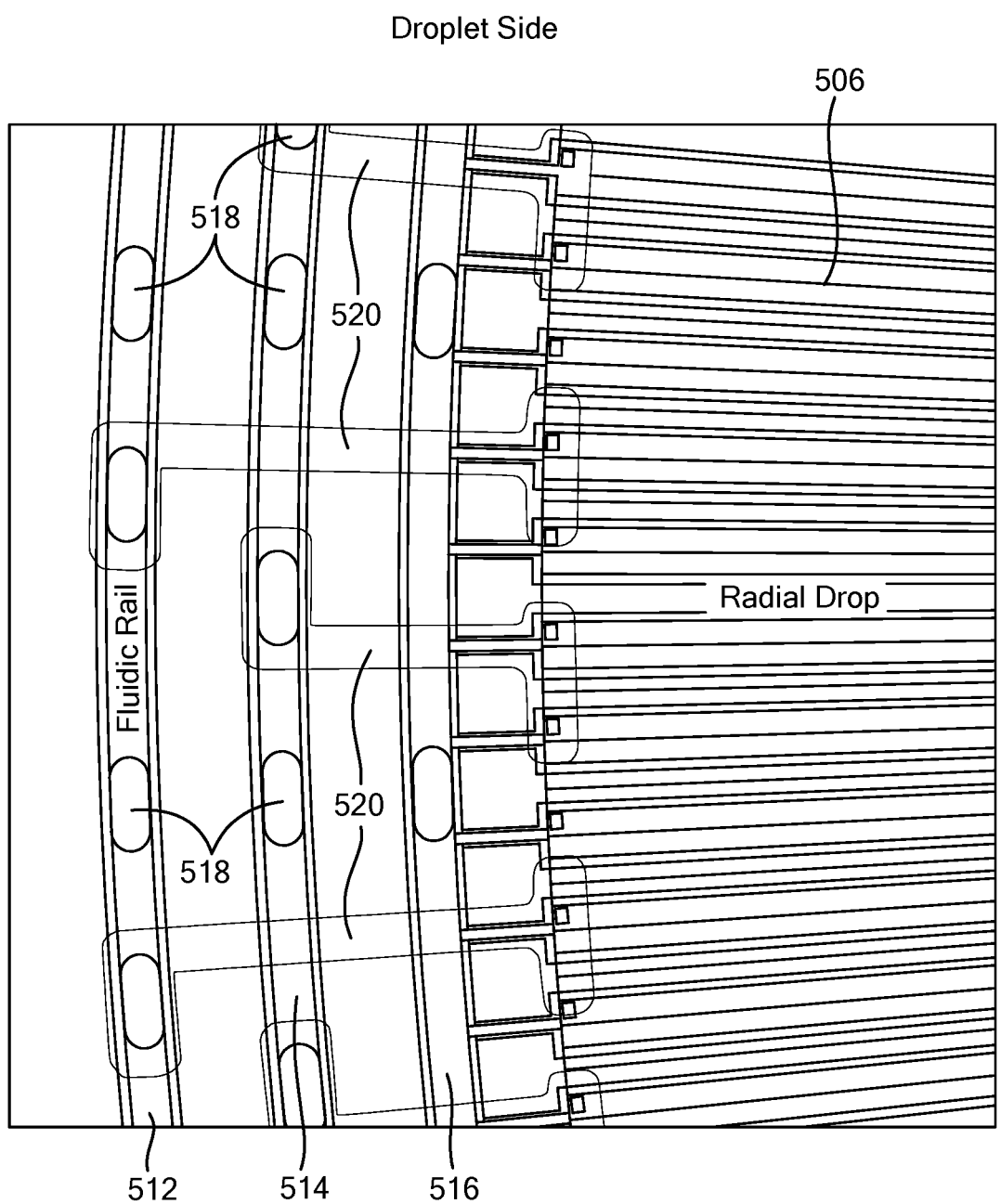
Figure 5C:
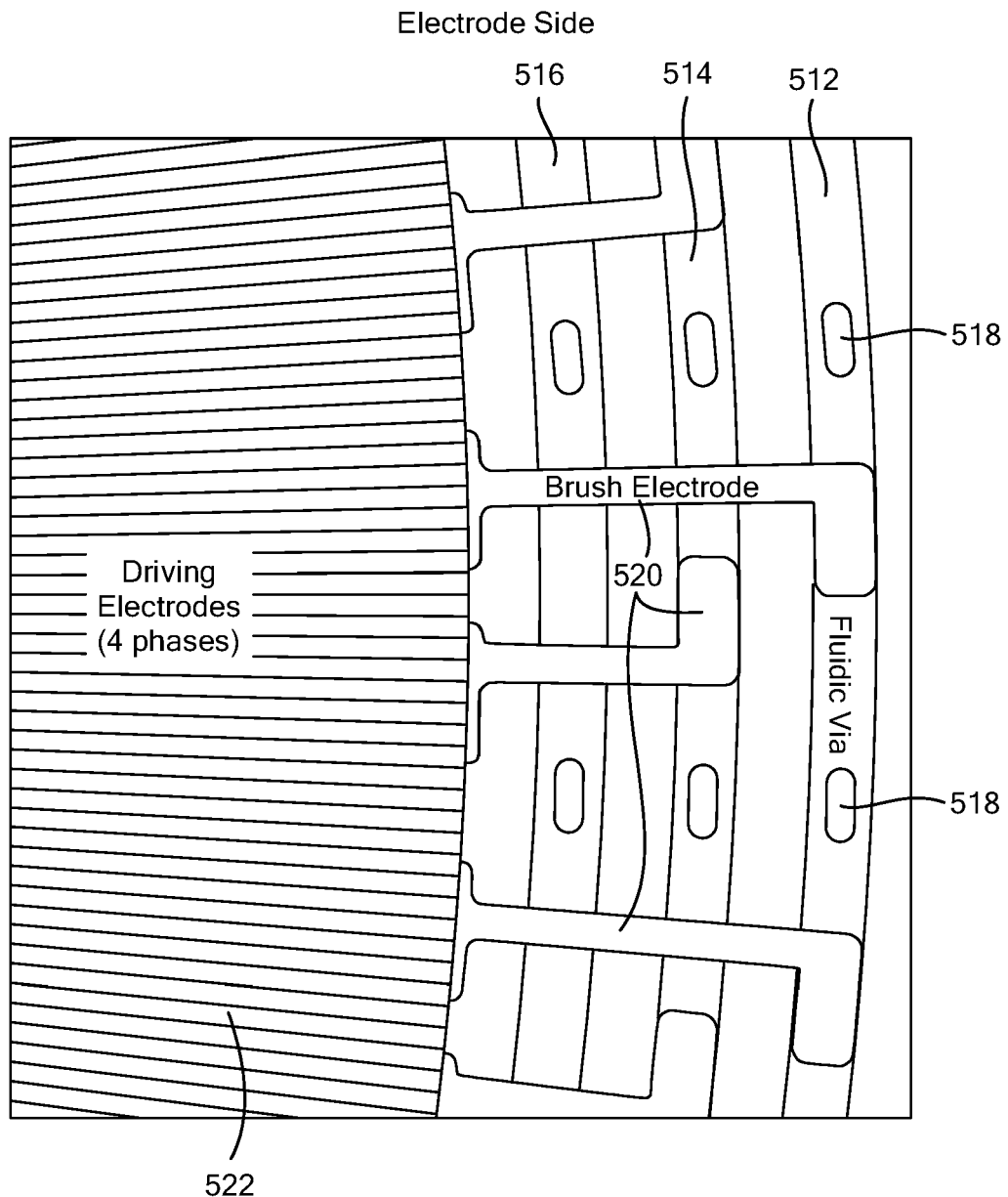

FIGS. 5A, 5B, and 5C show a detailed top and bottom view of layer 502. Layer 502 is a layer with a first side having liquid droplets and a second, opposite side having electrodes. Thus, layer 502 may be the same as or similar to the layers 304a-d shown in FIG. 3. FIG. 5B is an enlarged image of the droplet side of area 504 and FIG. 5C is an enlarged image of the electrode side of area 504 of the layer 502.

Referring to FIG. 5A, the first, droplet side of layer 502 may include an array of radial grooves 506 that each hold a liquid droplet. The radial grooves (and the droplets) may extend radially over a portion 508 of the radius, or along the entire length of the radius, of the layer 502 to create a ring 510.

The layer 502 may also have one or more circumferential rails that include grooves 512-516 positioned around the radial grooves 506. The circumferential grooves 512-516 may retain conductive liquid droplets that act as fluidic, electrical rails to carry signals to the electrodes. The rails may include one or more fluid vias 518 that allow motor brushes 520 to make electrical connections with the fluid within the rail as the brushes 520 pass over the vias 518.

The rails in FIG. 5B are positioned outside the outer circumference of ring 510. However, in embodiments, similar rails may be positioned on layer 502 inside the inner circumference of ring 510.

FIG. 5C shows the second, opposite side of layer 502, which includes one or more electrodes 522. The electrodes 522 may be electrically coupled to motor brushes 520 so that, as the brushes receive power from the control circuit, the electrodes become electrically charged. In embodiments, the electrodes 522 may become electrically charged when the brushes 520 pass over fluid vias 518 and meet the circumferential, conductive water droplets 512-516, forming an electrical connection between the conductive water droplets and the brushes.

Figure 5D:
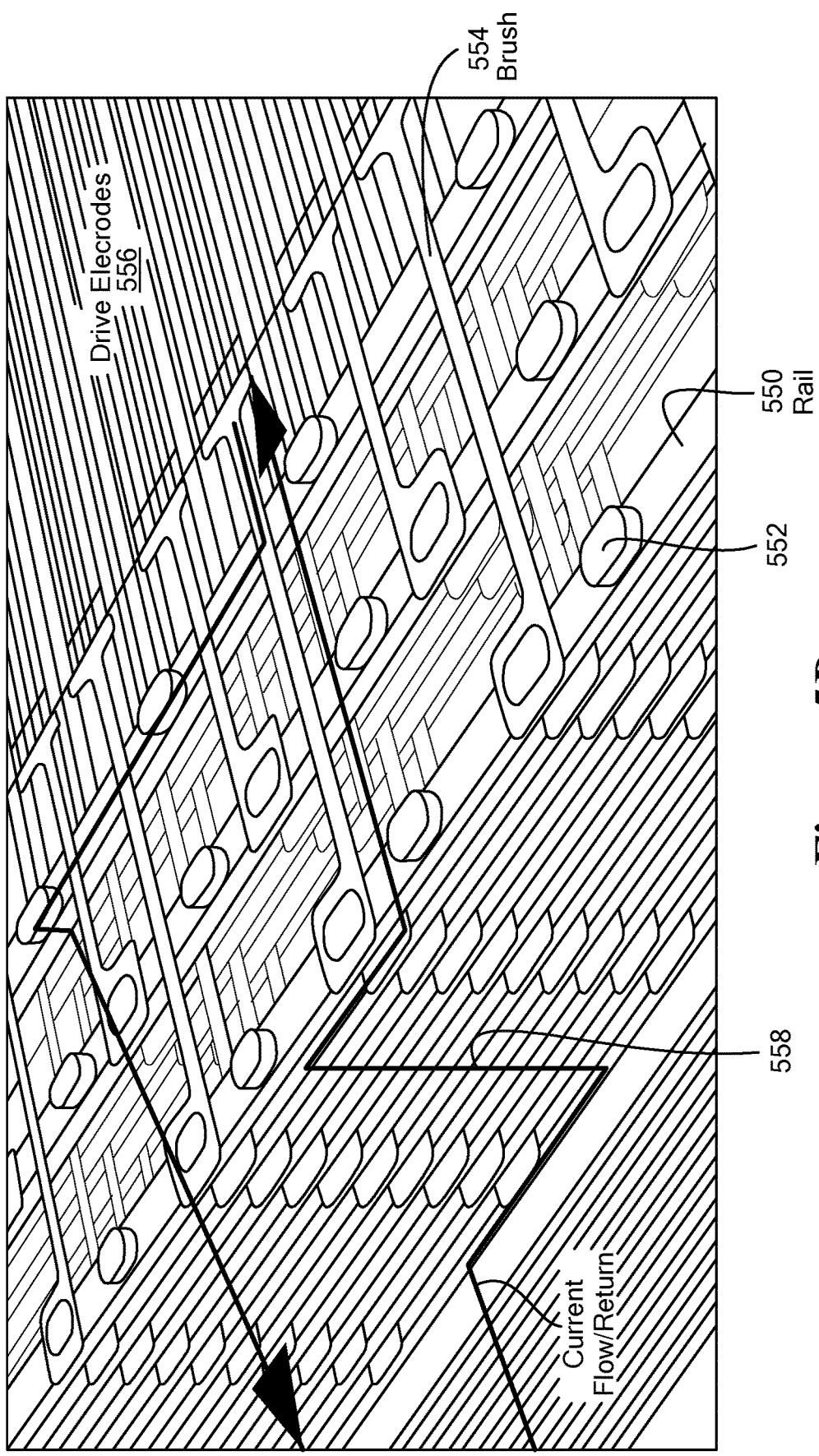
FIG. 5D is a transparent, isometric view of a stack of layers showing electrical connections between the layers.

FIG. 5D is a diagram showing the electrical power distribution network for a linear multilayer microhydraulic actuator (e.g. a linear motor). As mentioned above, electrical power may be distributed to some or all the layers in a stack. In embodiments, a liquid interconnect is used. Current (e.g. alternating current) flows from the base up through the fluidic rails 550 and vias 552, to the brushes 554, then to the drive electrodes 556. It then couples to the drive droplets in the layer above or below and returns through the fluidic rails and vias back to the base.

Path 558 illustrates the electrical power delivery path 558 through the actuator. Signals enter from a connector at the base, connect with a metal via to the brush electrodes, capacitively couple to the water 8M LiCl rails through an electrical double layer, ionically conduct through the fluidic rails and vias to Pt brush electrodes in each layer, transfer through a metal via to the Al drive electrodes, couple capacitively to the drive droplets to form the electrowetting capacitor, then return though the 8 M LiCl reference rail into the brush electrodes in the base, and return to the connector.

In embodiments, a flexible, foldable interconnect may also provide electrical connectivity between the layers. The interconnect may be formed from a flexible material, such as a thin plastic film, and may include one or more conductive elements. Conductive pins coupled between layers may also be used to provide electrical conductivity between the layers.

In the embodiment shown in FIGS. 5A-C, the electrodes may have an elongate shape and may extend in a radial direction, like the liquid droplets 506. This arrangement may be beneficial for a rotational actuator. However, in other embodiments, the liquid droplets and/or electrodes may have other shapes and be arranged in other positions depending on the type of actuator and motion desired.

Figure 6A:
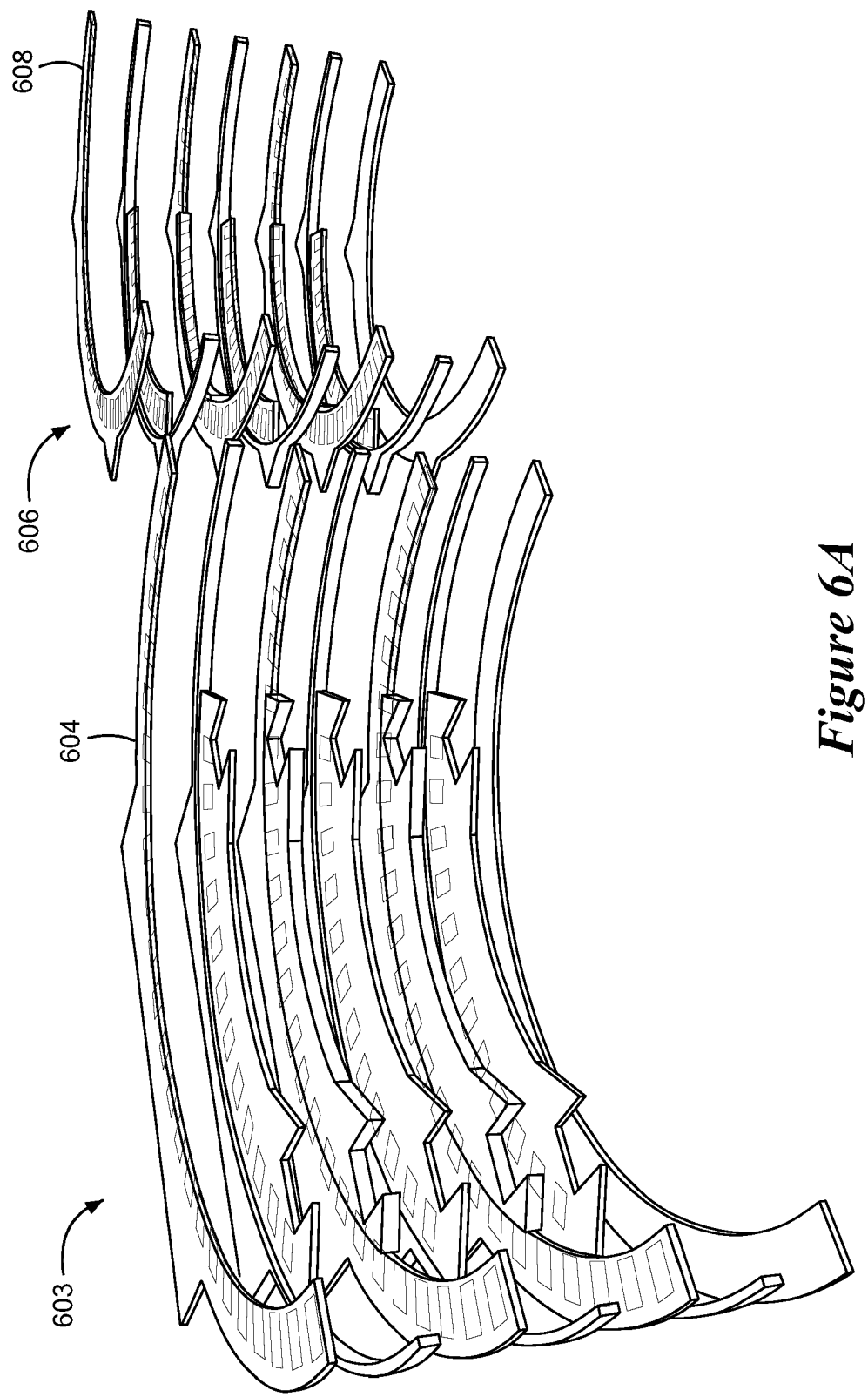
FIG. 6A is an isometric view of a plurality of linear microhydraulic actuators configured to control motion of a ball camera.
Figure 6B:
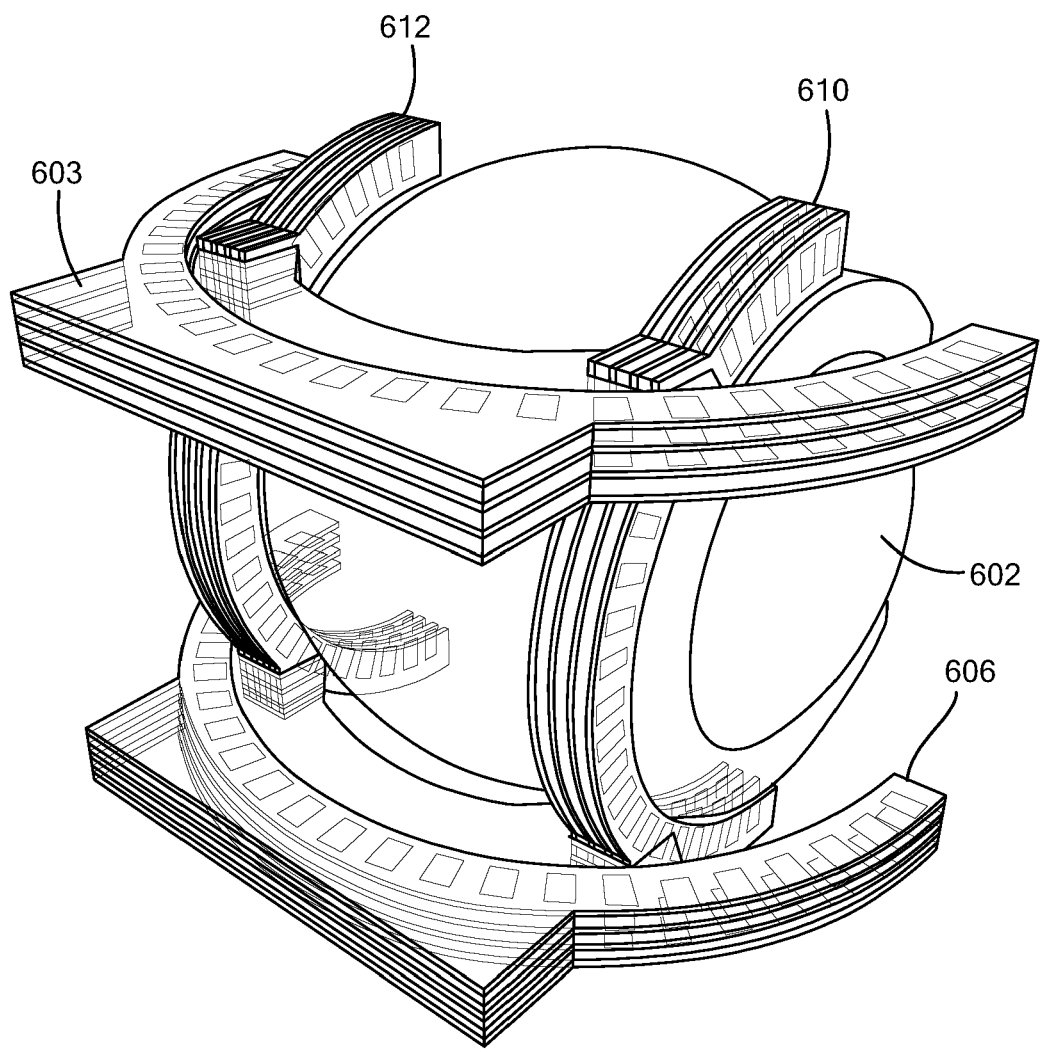
FIG. 6B is an isometric view of a portion of a linear hydraulic actuator.

For example, FIGS. 6A and 6B show a microhydraulic actuator configured to rotate a ball camera (e.g. artificial eye) 602. FIG. 6A is an exploded view of a stack 603 of semi-circular layers 604, and another stack 606 of semi-circular layers 608. When the stacks 603 and 606 are assembled, they create a track-shaped actuator that can rotate the ball camera 602. Additional stacks 610 and 612 may be added to rotate the ball camera in six degrees of freedom.

In this example, the stacks create a rail or track that can be used to move or rotate an object along the track. In general, the stacks can be manufactured in any desired shape to create rotary actuators, linear actuators, or actuators of any other shape and motion in addition to the rotary and track actuators described above.

Operation

The actuators described above operate by creating electrostatic (i.e. Coulomb) forces between the electrodes and the liquid droplets. When the electrode is energized, it creates an electrical field. The electrical field generates an electrostatic attractive force between the electrode and the liquid droplet. That force pulls the electrode and the droplet toward each other and moves the respective layers, creating the actuator's motion.

Figure 7:
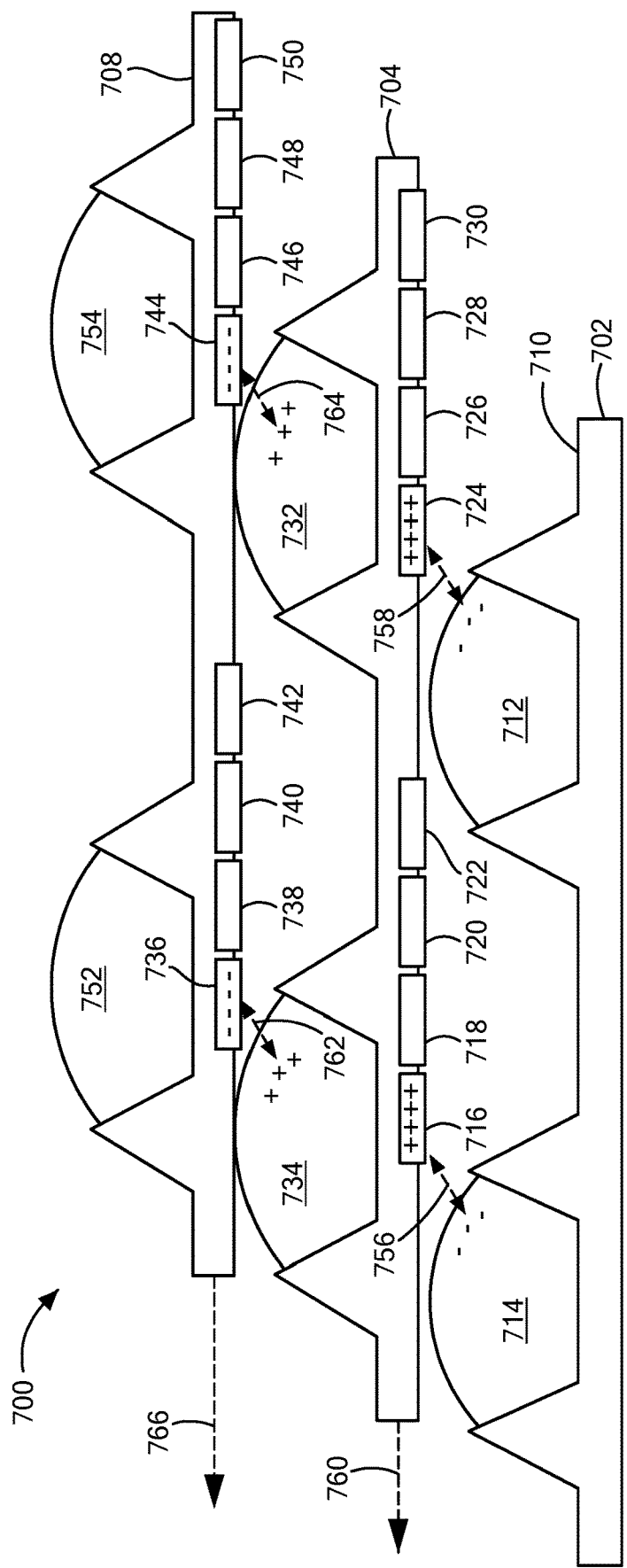
FIG. 7 is a diagram of a stack of layers illustrating relative motion between layers.

FIG. 7 is a cross-sectional diagram of three layers of an actuator, illustrating the operation of the electrostatic forces. In this example, assume that base layer 702 remains stationary and that layers 704 and 708 move relative to base layer 702.

As illustrated, base layer 702 includes a droplet side 710 and at least two droplets 712, 714. Layer 704 includes an electrode side shown with eight electrodes 716, 718, 720, 722, 724, 726, 728, and 730; and a droplet side having droplets 732 and 734. Similarly layer 708 has an electrode side shown with eight electrodes 736, 738, 740, 742, 744, 746, 748, 750; and a droplet side having droplets 752 and 754.

To create the motive force, electrodes 716 and 724 are activated with a positive charge. The positive charge of the electrodes induces a negative charge in the nearby areas of droplets 714 and 712. These two opposing charges create attractive, electrostatic forces indicated by arrows 756 and 758. The forces pull the layers together and, as a result, layer 704 moves in the direction of arrow 760.

Similarly, an attractive force can be achieved by activating the electrodes with a negative charge. For example, in this example, electrodes 736 and 744 are activated with a negative charge, which induces a positive charge in nearby liquid droplets 734 and 732, respectively. These opposing charges also create attractive, electrostatic forces indicated by arrows 762 and 764. The forces pull layers 704 and 708 together and, as a result, layer 708 moves in the direction of arrow 766.

In embodiments, multiple phases may be used to create continuous motion of the layers. Assume that electrodes 736, 738, 740, and 742 are activated in four subsequent phases. Electrode 736 is activated first and pulls layer 708 left relative to layer 704. Then electrode 736 is turned off and electrode 738 is activated and pulls layer 708 further left relative to layer 704. Next, electrode 738 is turned off and electrode 740 is activated and pulls layer 708 further left relative to layer 704. In the fourth phase, electrode 740 is turned off and electrode 742 is activated and pulls layer 708 yet further left relative to layer 704. Then the four phases can be repeated with a new set of four actuators (e.g. actuators 744-750) that come in proximity with droplet 734. In this way, the electrodes can be activated so that the actuator acts like a stepper motor. One skilled in the art will recognize that, by actuating the electrodes in different patterns, the control circuit can precisely control speed, position, and direction of each layer.

In this example, both layers 704 and 708 are rotating to the left, i.e. in the direction of arrows 760 and 766, while base layer 702 is stationary. Accordingly, the speed of each layer's rotation is based on the frequency of the phases, and on the speed of the adjacent layer. For example, layer 704 is rotating with an angular velocity of θ relative to base layer 702. Assuming the phases of electrode activation on both layers are the same, top layer 708 is rotating with a speed of θ relative to middle layer 704. Thus, top layer 708 is rotating with a speed 2θ relative to bottom layer 702. Additional layers added on top of layer 708 and rotating in the same direction may have increased speed. For example, a fourth layer added on top of layer 708 may rotate with an angular velocity of 3θ relative to bottom layer 702, a fourth layer may rotate with an angular velocity of 4θ, etc.

Figure 8:
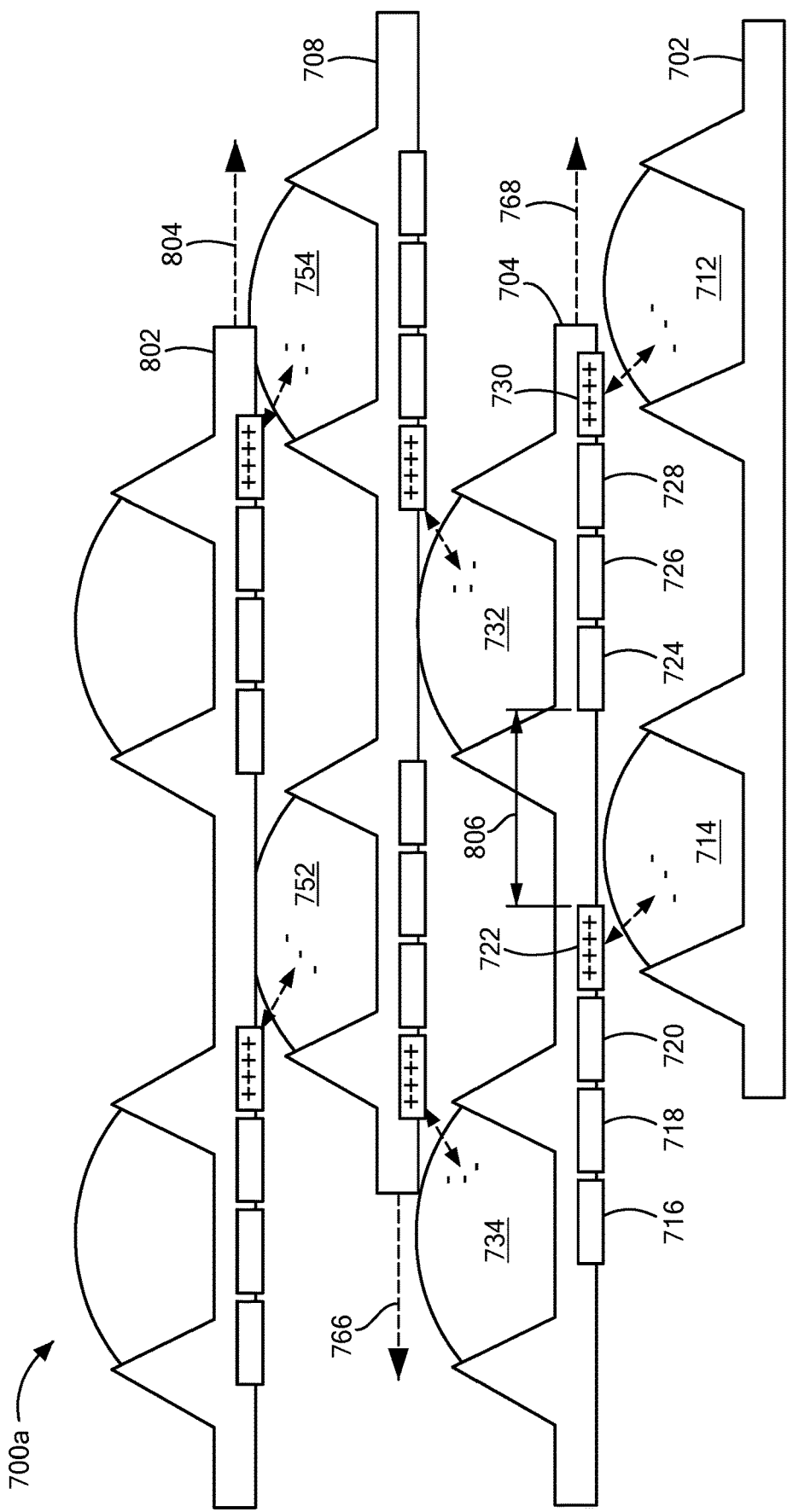
FIG. 8 is a diagram of another embodiment of a stack of layers illustrating relative motion between the layers.

Referring to FIG. 8, the frequency and direction of the phases of the electrodes can be changed to change the speed and/or torque output of the actuator. In this example, an additional layer is shown to illustrate the concept.

In layer 704, the four-phase electrode activation may be reversed so that electrodes 730 and 722 are activated first, then electrodes 728 and 720, then electrodes 726 and 718, and then electrodes 724 and 716. As a result, the motion of layer 704 with respect to base layer 702 is also reversed, resulting in layer 704 moving to the right (as indicated by arrow 768), with a velocity of θ in the direction of arrow 768. Layer 708 is configured to move to the left, as indicated by arrow 766. And layer 802 is configured to move to the right, as indicated by arrow 804.

In this example, because the direction of some of the layers is reversed, the angular velocity of layer 704 is θ (in the direction of arrow 768) relative to the base layer 702, the angular velocity of layer 708 is zero relative to the base layer 702, and the velocity of layer 802 is θ (in the direction of arrow 804) relative to layer 702. In other words, in this example, every other row has a velocity θ, and the alternate rows have a velocity of zero relative to the base layer. However, the torque produce by layer 802 is increased relative to the torque produced by layer 704. If, for example the torque produced by layer 704 is τ, the torque produced by layer 802 may be 2τ.

The examples shown in FIGS. 7 and 8 include three and four layers, respectively. Of course, the actuators presented in this disclosure can have any arbitrary number of layers; they are not limited to three or four layers as shown in these examples. Thus, depending on the configuration, the velocity of the layers and the torque of the actuator can be configured to any arbitrary velocity and torque within the mechanical confines of the particular actuator's configuration.

The figures in this disclosure, including FIGS. 7 and 8, may not be drawn to scale. For example, in FIGS. 7 and 8, there is a gap between sets of actuators (e.g. gap 806 between electrodes 722 and 724). This gap is shown for ease of illustrating multi-phase actuator activation and is not necessarily present in embodiments of the actuator. Of course, some actuator configures may include gaps between some or all electrodes depending on the actuator configuration.

The speed and torque configurations described above are a subset of possible layer arrangements. In general, a multilayer stack can comprise M regular, and N inverted electrode order layers, alternating up through the actuator. Alternatively, the forward and reverse layers need not alternate. An actuator may have multiple forward direction layers and multiple reverse-direction layers in any order. The ability to provide configurations with different gear ratios, i.e. different speed and/or torque configurations described above, may be beneficial for micro-actuator applications where the disclosed microhydraulic actuators may provide gearing solutions that are more efficient, smaller, and lighter than traditional actuator solutions.

Figure 9:
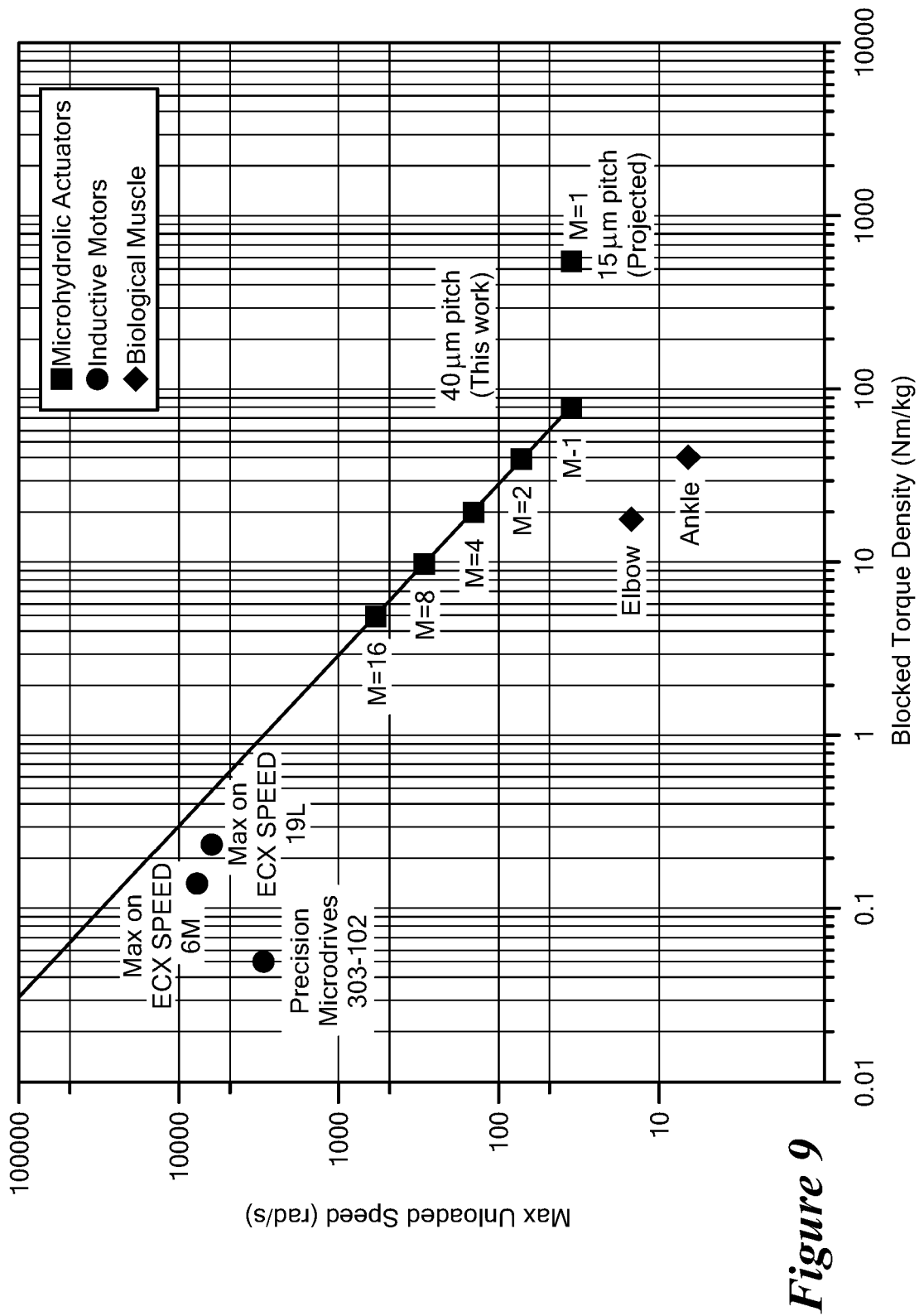
FIG. 9 is a graph showing comparing characteristics of a microhydraulic actuator of this disclosure with an inductive motor and biological muscles.

FIG. 9 is a plot of maximum unloaded angular velocity and blocked torque density for various rotational actuators. Inductive motors tend to have a high speed at low torque density, while microhydraulic motors and biological joints tend to have a low velocity and a high torque density. Different M layer configuration can exchange speed for torque. The microhydraulic actuators that were measured for this chart had droplets with 40 μm pitch, while 15 μm droplet pitch devices are projected from scaling trends.

Figure 10:
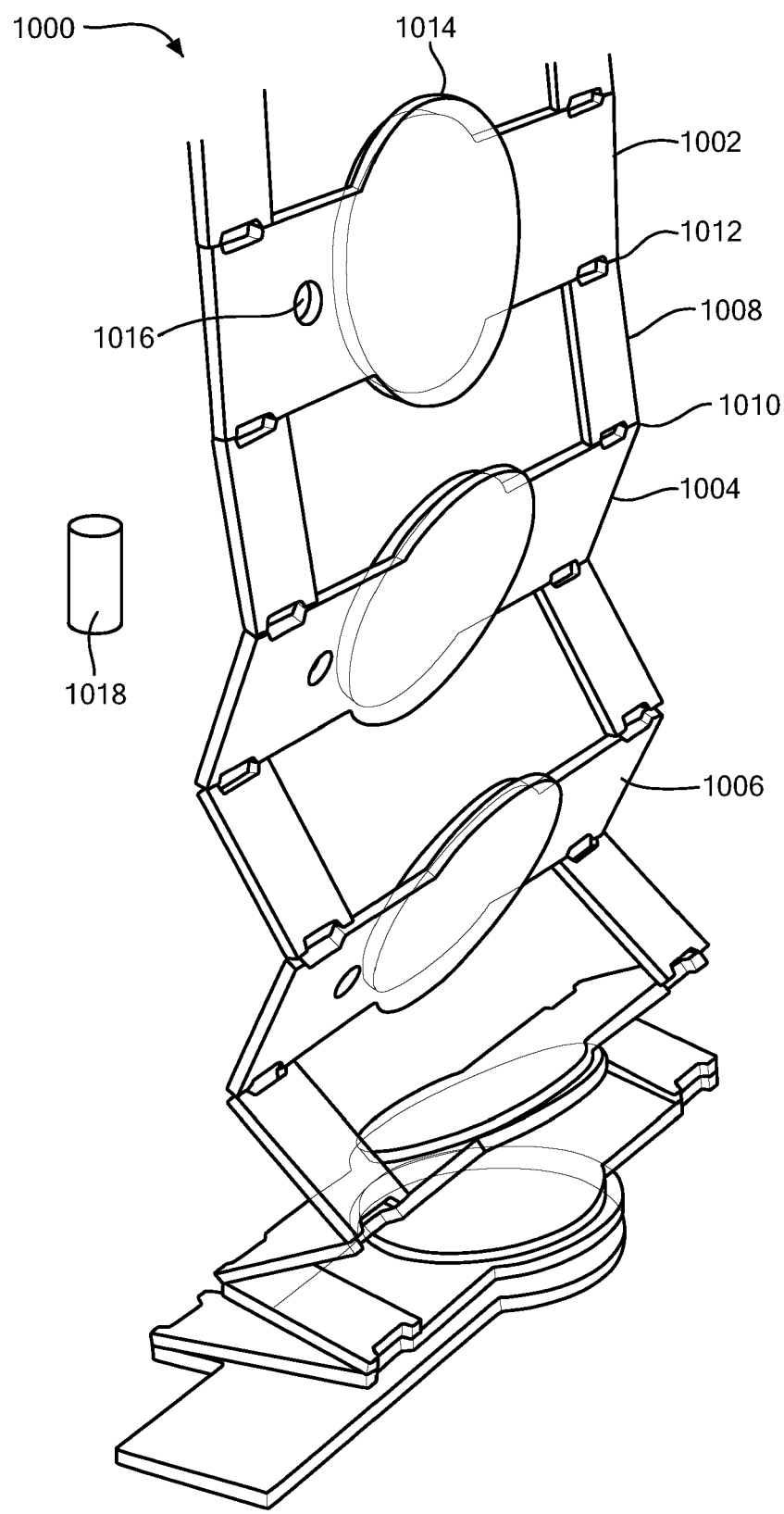
FIG. 10 is an isometric diagram of an embodiment of a microhydraulic actuator with foldable interconnects and a pin.

FIG. 10 is an isometric view of an embodiment of a microhydraulic actuator 1000 with foldable layers. Actuator 1000 may have a plurality of stator layers 1002, 1004, 1006, etc. The stator layers may be connected by one or more interconnection elements 1008, which connect to the stator layers via a hinge (e.g. hinges 1010, 1012). Each stator layer 1002, 1004, 1006 may be associated with a movable rotor layer (e.g. rotor layer 1014) which may be rotatably coupled to the stator layer. As described above, the rotor layer may include a plurality of liquid droplets that can be used to create actuator motion. The stator layers may include one or more electrodes that can generate electrostatic force between the electrodes and the liquid droplets, as describe above, to generate actuator motion.

In embodiments, the stator layers (e.g. 1002, 1004) and the interconnection elements (e.g. 1008) may include conductors (not shown) etched or embedded thereon that provide electrical interconnectivity between the layers. The conductors can carry power and/or control signals between the layers and to/from the control circuit.

Additionally or alternatively, the stator layers may include one or more holes or vias (such as via 1016) through which one or more conductive pins (such as pin 1018) can be inserted. The conductive pins 1018 may provide electrical connectivity and carry power and/or control signals between the layers and to/from the control circuit.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to disposing or otherwise positioning element "A" over element "B" include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. As used herein, the terms "comprise," "comprises," "comprising, "include," "includes," "including," "has," "having," "contains" or "containing," or any other variation thereof, are intended to cover a non-exclusive inclusion. For example, an apparatus, a method, a composition, a mixture or an article, that comprises a list of elements is not necessarily limited to only those elements but can include other elements not expressly listed or inherent to such apparatus, method, composition, mixture, or article.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "embodiments," "one embodiment, "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, relative or positional terms including but not limited to the terms "upper," "lower," "right," "left," "vertical," "horizontal," "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

In this disclosure, the term actuator refers to a component or device that causes motion and control by creating motion of one or more parts of a machine. Actuators include, but are not limited to, motors. In this disclosure, the terms actuator and motor are sometimes used interchangeably.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

Accordingly, it is submitted that that scope of the patent should not be limited to the described implementations but rather should be limited only by the spirit and scope of the following claims.

All publications and references cited herein are expressly incorporated herein by reference in their entirety Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture or an article, that comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e. one, two, three, four, etc. The term "plurality" indicates any integer number greater than one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether or not explicitly described.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this disclosure are expressly incorporated by reference in their entirety.

The invention claimed is:

1. An actuator, comprising:
a plurality of stacked layer structures including:
one or more first layer structures having one or more wells formed from a combination of indentations in at least one side of the one or more first layer structures and wall structures projecting from the at least one side of the one or more first layer structures, wherein disposed in the one or more wells are one or more liquid droplets pinned to the at least one side of the one or more first layer structures;
one or more second layer structures having electrodes coupled to at least one side of the one or more second layer structures;
wherein the plurality of stacked layer structures are stacked so that the sides of the first layer structures having liquid droplets are facing the sides of the second layer structures having electrodes; and
a control circuit electrically coupled to selectively energize at least one electrode of the one or more second layer structures to induce an electrostatic charge in at least one of the liquid droplets.

2. The actuator of claim 1, wherein the stacked layer structures have a thickness of 25 µm or less.

3. The actuator of claim 1, wherein the stacked layer structures have a thickness of 10 µm or less.

4. The actuator of claim 1, wherein the electrodes are configured to move the one or more first layer structures relative to the one or more second layer structures by electrostatically attracting the one or more liquid droplets pinned to the one or more wells in the one or more first layer structures.

5. The actuator of claim 1, wherein the liquid droplets are electrically conductive and wherein at least one of the liquid droplets forms an electrical connection between at least one of the one or more first layer structures and at least one of the one or more second layer structures.

6. The actuator of claim 1, wherein the liquid droplets comprise water.

7. The actuator of claim 1, further comprising a layer of oil disposed about the one or more liquid droplets.

8. The actuator of claim 1, wherein the one or more first layer structures and one or more second layer structures are disc-shaped and the actuator is a rotational motor.

9. The actuator of claim 1, wherein the one or more first layer structures and the one or more second layer structures comprise tracks and the actuator is a linear motor.

10. The actuator of claim 1, wherein the control circuit is configured to selectively energize one or more electrodes on one layer to electrostatically attract the liquid droplets on an adjacent layer.

11. The actuator of claim 1, wherein the control circuit is electrically coupled to the electrodes through one or more of: the liquid droplets, a flexible interconnect between the first layer structures and the second layer structures, a via through at least one of the layers of the plurality of stacked layer structures, and a conductive pin coupled to one or more of the first layer structures and/or one or more of the second layer structures.

12. An actuator comprising:
a stack of at least two layer structures, each of the at least two layer structures having first and second opposing surfaces with a first one of the first and second opposing surfaces corresponding to a droplet surface having a plurality of wells formed therein with the wells formed from a combination of indentations in the droplet surface and wall structures projecting from the droplet surface and the second one of the first and second opposing surfaces corresponding to an electrode surface having one or more electrodes coupled thereto; and
a liquid droplet disposed in each of the plurality of wells and pinned to at least one side of a surface of the well;
wherein the layer structures in the stack of layer structures are stacked so that the surfaces of one layer structures having liquid droplets are facing surfaces of layer structures having electrodes.

13. The actuator of claim 12, further comprising a base layer structure configured to immobilize at least one layer structure of the at least two layer structures.

14. The actuator of claim 12, further comprising a control circuit electrically coupled to selectively energize the one or more electrodes to induce an electrostatic charge in the liquid droplet.

15. The actuator of claim 14, wherein the control circuit is configured to cause at least some of the layer structures to move in a same direction to increase a speed output of the actuator, wherein the control circuit is electrically coupled to the one or more electrodes through one or more of: the liquid droplet, a foldable flexible interconnect, a via through at least one of the layer structures, and a conductive pin coupled to at least two of the layer structures.

16. The actuator of claim 12, wherein the layer structures have a thickness of 25 μm or less.

17. The actuator of claim 12, wherein the layer structures have a thickness of 10 μm or less.

18. The actuator of claim 12, wherein the liquid droplet forms an electrical connection between at least two of the layer structures.

19. An actuator, comprising:
two or more layer structures, each of the two or more layer structures having first and second opposing surfaces with a first one of the first and second opposing surfaces corresponding to a droplet surface having a plurality of wells formed therein with the wells formed from a combination of indentations in the droplet surface and wall structures projecting from the droplet surface wherein the combination of the indentations in the droplet surface and wall structures provide a liquid droplet with a height H which is greater that a height which may be achieved using either the indentation or wall structure alone and a second one of the first and second opposing surfaces corresponding to an electrode surface having one or more electrodes; and
the liquid droplet disposed in respective ones of the plurality of wells and each of the liquid droplets pinned to a surface of the well in which the liquid droplet is disposed;
wherein the two or more layer structures are stacked such that each droplet surface is disposed over an electrode surface of an adjacent layer structure.

20. The actuator of claim 19, wherein the two or more layer structures have a thickness of 25 μm or less.

21. The actuator of claim 19, wherein the two or more layer structures have a thickness of 10 μm or less.

22. The actuator of claim 19, wherein the one or more electrodes correspond to an array of electrodes and the liquid droplet corresponds to an array of liquid droplets, wherein the array of electrodes and the array of liquid droplets are integrated into one thin film having first and second opposing surfaces with the array of liquid droplets disposed on a first one of the first and second opposing surfaces of the thin film and the array of electrodes disposed on a second one of the first and second opposing surfaces of the thin film.

23. The actuator of claim 19, wherein the liquid droplets are electrically conductive and wherein at least one of the liquid droplets forms an electrical connection between at least one of the first one of the first and second opposing surfaces and at least one of the second one of the first and second opposing surfaces.

24. The actuator of claim 19, wherein the first one of the first and second opposing surfaces and the second one of the first and second opposing surfaces are disc-shaped and the actuator is a rotational motor.

25. The actuator of claim 19, wherein the first one of the first and second opposing surfaces and the second one of the first and second opposing surfaces comprise tracks and the actuator is a linear motor.

26. The actuator of claim 19, further comprising a control circuit configured to selectively energize one or more electrodes on one layer to electrostatically attract the liquid droplets on an adjacent layer.

27. The actuator of claim 26, wherein the control circuit is electrically coupled to the electrodes through one or more of: the liquid droplets; a flexible interconnect between the first one of the first and second opposing surfaces and the second one of the first and second opposing surfaces; a via through at least one of the layers of the layer structures; and a conductive pin coupled to the first one of the first and second opposing surfaces and the second one of the first and second opposing surfaces.

* * * * *